(12) United States Patent
Pampus et al.

(10) Patent No.: US 8,797,186 B2
(45) Date of Patent: Aug. 5, 2014

(54) PARKING ASSISTANCE SYSTEM FOR ASSISTING IN A PARKING OPERATION FOR A PLURALITY OF AVAILABLE PARKING SPACES

(75) Inventors: Christian Pampus, Leonberg (DE); Volker Niemz, Rutesheim (DE)

(73) Assignee: Robert Bosch GmbH, Stuttgart (DE)

( * ) Notice: Subject to any disclaimer, the term of this patent is extended or adjusted under 35 U.S.C. 154(b) by 168 days.

(21) Appl. No.: 13/228,422

(22) Filed: Sep. 8, 2011

(65) Prior Publication Data

US 2012/0062394 A1 Mar. 15, 2012

(30) Foreign Application Priority Data

Sep. 10, 2010 (DE) .......................... 10 2010 040 591

(51) Int. Cl.
*B60Q 1/48* (2006.01)
*B60Q 1/00* (2006.01)
*G01C 22/00* (2006.01)
*G06F 19/00* (2011.01)

(52) U.S. Cl.
USPC ............ 340/932.2; 340/439; 701/23; 701/25; 701/44

(58) Field of Classification Search
USPC ...................................... 340/932.2
See application file for complete search history.

(56) References Cited

U.S. PATENT DOCUMENTS

| | | | |
|---|---|---|---|
| 6,426,708 B1 | 7/2002 | Trajkovic et al. | |
| 7,366,595 B1 * | 4/2008 | Shimizu et al. | 701/301 |
| 2007/0282504 A1 * | 12/2007 | Luke et al. | 701/44 |
| 2009/0121899 A1 * | 5/2009 | Kakinami et al. | 340/932.2 |
| 2010/0332080 A1 * | 12/2010 | Bae | 701/42 |

FOREIGN PATENT DOCUMENTS

| | | | |
|---|---|---|---|
| DE | 10 2005 045 259 | 3/2007 | |
| DE | 10 2007 002 261 | 8/2008 | |
| DE | 10 2008 004 633 | 7/2009 | |
| DE | 10 2009 005 506 | 10/2009 | |
| DE | 10 2009 046 726 | 5/2011 | |
| EP | 1 862 376 | 12/2007 | |
| EP | 2207350 A1 * | 7/2010 | B62D 15/02 |
| JP | 6-187597 | 7/1994 | |
| WO | WO 2009/135538 | 11/2009 | |

\* cited by examiner

*Primary Examiner* — Jennifer Mehmood
*Assistant Examiner* — John Mortell
(74) *Attorney, Agent, or Firm* — Kenyon & Kenyon LLP (57) ABSTRACT

A parking assistance system is described for assisting in a parking operation of a vehicle when a plurality of parking spaces is present. A method in a parking assistance system includes performing the following: detecting a plurality of parking spaces; selecting one of the detected parking spaces based on a degree of comfort; and assisting in the parking operation into the selected parking space. The degree of comfort includes at least one predefined condition, on the basis of which the detected parking spaces are classifiable according to the presumed driver acceptance.

13 Claims, 8 Drawing Sheets

PARKING ASSISTANCE SYSTEM FOR ASSISTING IN A PARKING OPERATION FOR A PLURALITY OF AVAILABLE PARKING SPACES

FIELD OF THE INVENTION

The present invention relates to a method in a parking assistance system for assisting in a parking operation of a vehicle, and a corresponding parking assistance system. The present invention relates in particular to assisting in a parking operation when a plurality of parking spaces is present.

BACKGROUND INFORMATION

A parking assistance system assists the driver in parking a vehicle. The assistance system measures a parking space as the vehicle travels by, and subsequently guides the driver into the measured parking space. The guiding may occur in a passive form, in which the driver receives steering angle instructions and starting and stopping commands which are transmitted via a human-machine interface (HMI). For active automatic guiding, the parking assistance system takes over transverse and/or longitudinal guiding of the vehicle, and the driver receives only starting and stopping instructions, for example.

Figure 1:
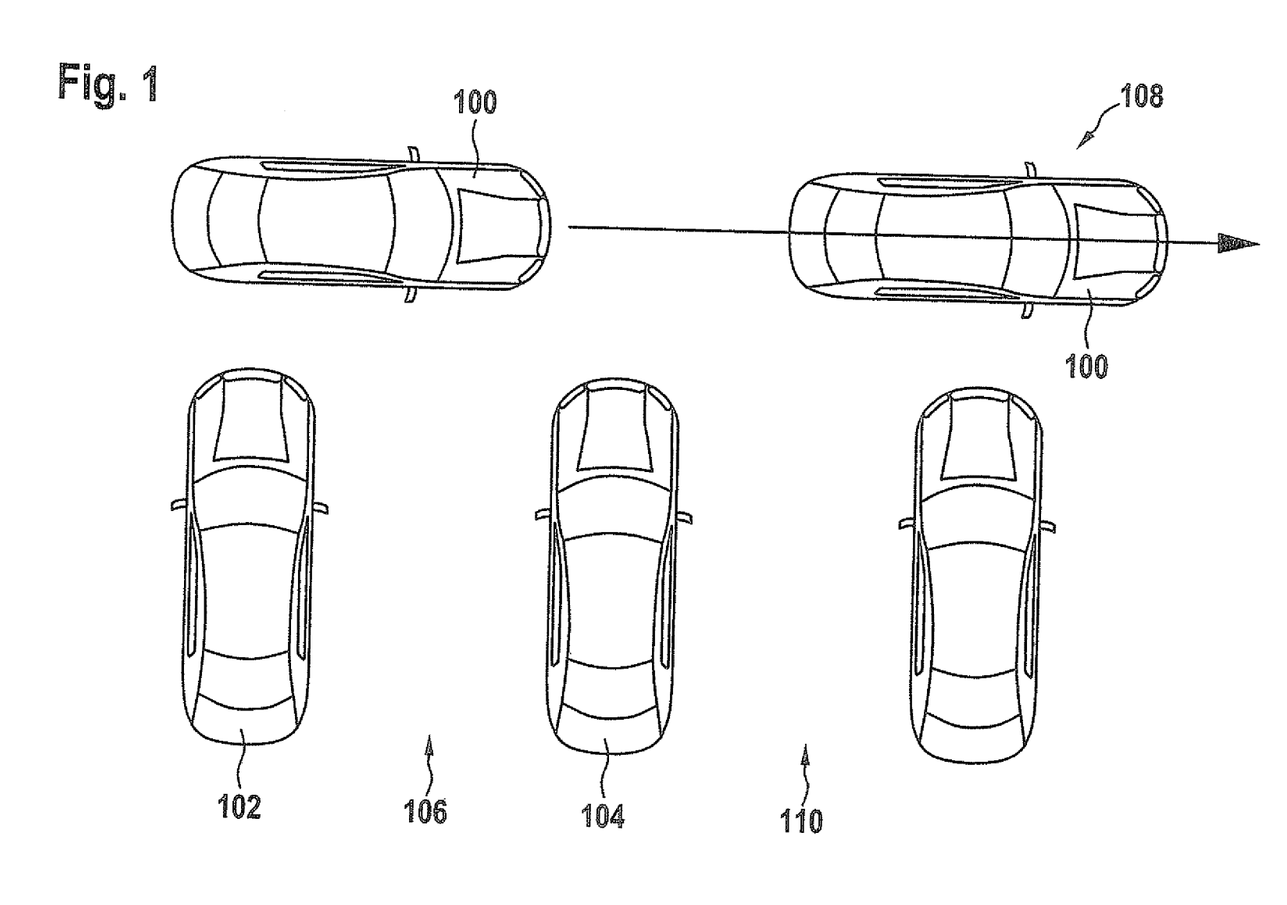
FIG. 1 shows in schematic form a frequently occurring situation with multiple available parking spaces.

In practice, the situation may often occur that two parking spaces, one immediately behind the other, are present. FIG. 1 explains such a situation, using the example of two perpendicular parking spaces. A vehicle 100 travels past objects 102 and 104 which border parking spaces. An available parking space 106 is measured, identified as a suitable parking space, and offered to the driver via the HMI. Since in accordance with regulatory requirements a parking assistance system may generally be activated only at a standstill, the driver must first bring vehicle 100 to a stop. This generally does not occur until a position 108 due to a certain reaction time of the driver and a braking distance. However, at this position the parking assistance system has already detected parking space 110. The driver now expects to park in parking space 106, but the system unexpectedly guides him into parking space 110. Due to relative position 108 of vehicle 100 with respect to parking space 110, this results in a parking operation having short stops during backing, wide swings, etc., which is atypical for human drivers and which often is not readily accepted by the driver (and possibly other motorists).

Similar problems may also arise for two or more parking spaces immediately adjacent to one another, in particular (but not exclusively) for perpendicular parking spaces. It is conceivable to provide a complex HMI which indicates to the driver the identified parking spaces, so that the driver is able to select one of the parking spaces. Such a system could possibly require a complicated graphical display for illustrating the plurality of parking spaces in the surroundings of the vehicle. Such complicated systems are complex in their implementation, and entail correspondingly high costs.

SUMMARY OF THE INVENTION

According to the exemplary embodiments and/or exemplary embodiments of the present invention, a method in a parking assistance system for assisting in a parking operation of a vehicle is proposed which has the following steps: detecting a plurality of parking spaces; selecting one of the detected parking spaces based on a degree of comfort; and assisting in the parking operation into the selected parking space. The degree of comfort includes at least one predefined condition, on the basis of which the detected parking spaces are classifiable according to the presumed driver acceptance.

In one specific embodiment of the present invention, the at least one predefined condition concerns a classification of the detected parking spaces according to a minimum swing-out behavior of the vehicle during the parking operation. In one design of this specific embodiment, the predefined condition is used only within a travel range, based on one or more of the detected parking spaces, for classifying these parking spaces.

Alternatively or additionally, the at least one predefined condition may concern a classification of the detected parking spaces according to the presence of sufficient space for the driver to comfortably exit the vehicle. Additionally or alternatively, the at least one predefined condition may concern a classification of the detected parking spaces according to the presence of sufficient space for the passenger to comfortably exit the vehicle.

In one specific embodiment of the present invention, the at least one predefined condition may concern a classification of the detected parking spaces based on a detection of a driver action. The driver action may, for example, include a gear shift and/or an operation of a vehicle brake. In one design of this specific embodiment, the predefined condition is used only within a tolerance range, based on one or more of the detected parking spaces, for a classification of these parking spaces.

According to the exemplary embodiments and/or exemplary embodiments of the present invention, in addition a computer program is proposed which is run for carrying out one of the above-described specific embodiments of the method according to the present invention when the computer program is executed on a programmable computer device. Such a computer device may be, for example, a system in a vehicle on which a parking assistance system is implemented. The computer program may also be stored on a machine-readable data carrier, for example a permanent or rewritable medium in or in association with a programmable computer device, or a CD-ROM, a DVD, or a USE stick. Additionally or alternatively, the computer program may be provided for downloading on a programmable computer device, for example via a data network such as the Internet, or a communication connection such as a telephone line or a wireless connection.

According to the exemplary embodiments and/or exemplary embodiments of the present invention, in addition a parking assistance system is proposed which is designed for assisting in a parking operation of a vehicle. A parking assistance system according to the present invention has the following components: a component for detecting a plurality of parking spaces; a component for selecting one of the detected parking spaces based on a degree of comfort; and a component for assisting in the parking operation into the selected parking space. The degree of comfort includes at least one predefined condition, on the basis of which the detected parking spaces are classifiable according to the presumed driver acceptance.

Using the exemplary embodiments and/or exemplary embodiments of the present invention, a simple and therefore cost-effectively implementable parking assistance system is proposed which selects a parking space among a plurality of detected parking spaces instead of always offering only the last detected parking space. The selection (decision) of which of the plurality of available parking spaces the vehicle is to be guided into is not passed on to the driver, so that a complex HMI which would otherwise be necessary may be dispensed with. Instead, a degree of comfort is implemented for the automatic selection which, for example, is intended to allow a selection that is typical for human drivers. This occurs by providing one or multiple predefined conditions which are processed as soon as more than one suitable parking space has been detected.

The detected parking spaces are classified based on the conditions. If the conditions are designed for a presumed driver acceptance, for example, a correspondingly high level of driver acceptance may also be achieved. By appropriately designing the condition(s), the system is able to a large extent to behave in a driver-intuitive way; i.e., the system selects a parking space which the driver himself would have selected, on which he would likewise decide or also prefer, or which, among the available suitable parking spaces, the driver would most likely accept. The incorporation of the presumed driver intent according to an adaptive parking space selection according to the exemplary embodiments and/or exemplary embodiments of the present invention increases driver comfort.

Further aspects and advantages of the exemplary embodiments and/or exemplary embodiments of the present invention are now described in greater detail with reference to the appended figures.

BRIEF DESCRIPTION OF THE DRAWINGS

FIG. 6b shows the situation after parking, in the second application scenario from FIG. 6a.

DETAILED DESCRIPTION

Figure 2:
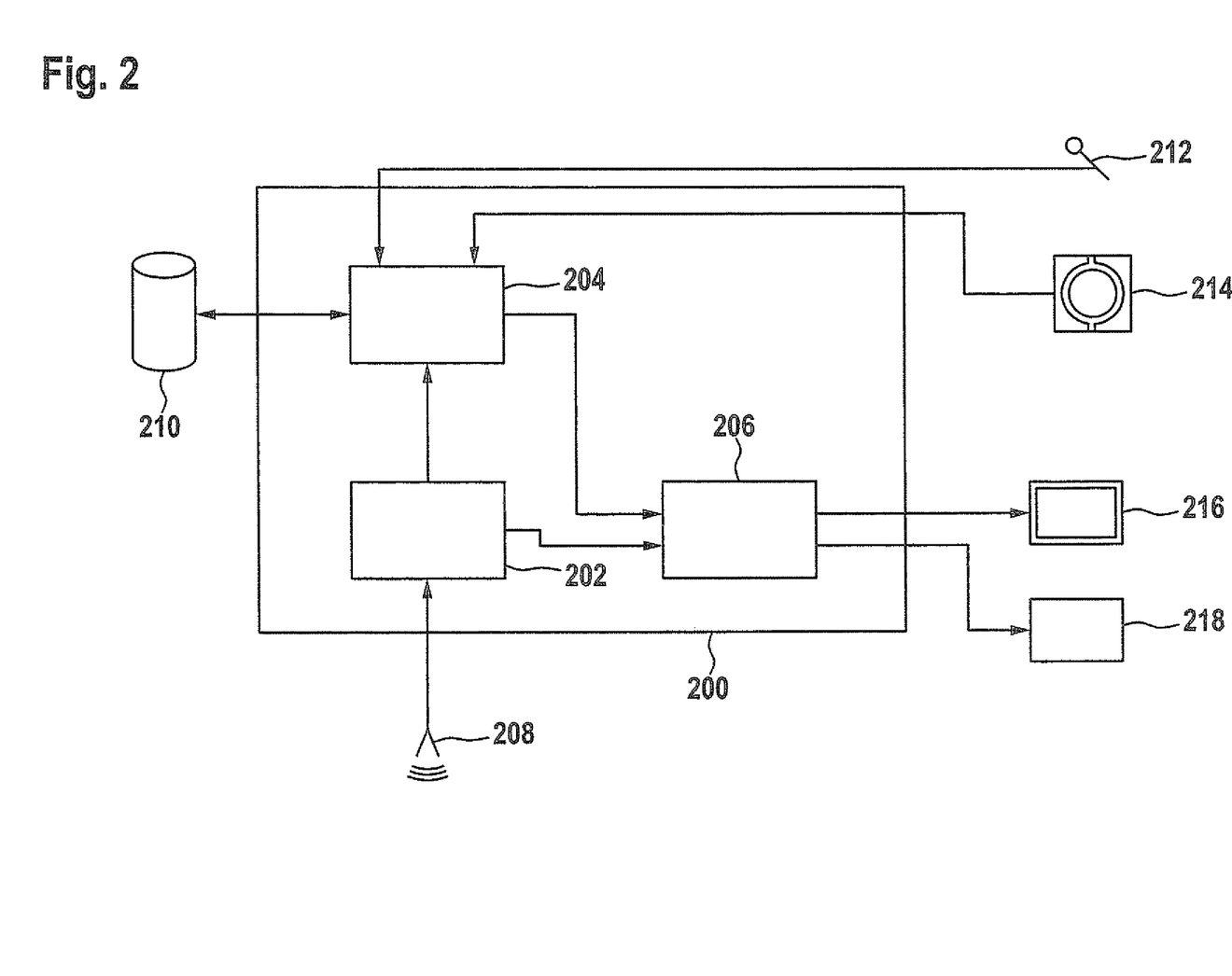
FIG. 2 shows, in the form of a block diagram, functional components of one exemplary embodiment of a parking assistance system according to the present invention.

FIG. 2 shows, in the form of a block diagram, functional components of one exemplary embodiment 200 of a parking assistance system according to the exemplary embodiments and/or exemplary embodiments of the present invention. Assistance system 200 includes a detection module 202, a selection module 204, and an assistance module 206. A mode of operation of parking assistance system 200 is described below with reference to the flow chart in FIG. 3.

Figure 3:
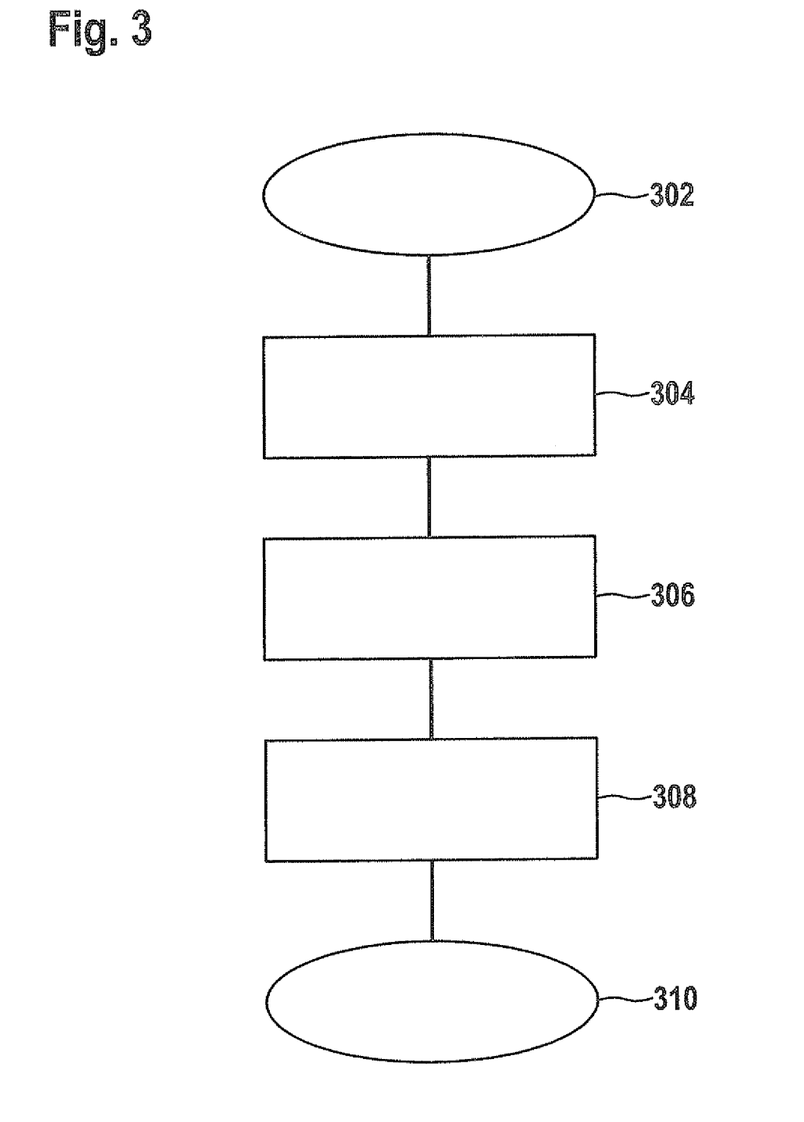
FIG. 3 shows, in the form of a flowchart, an operating method of the parking assistance system illustrated in FIG. 2.

Parking assistance system 200 is designed for assisting in a parking operation when a plurality of detected parking spaces is present (302). Detection module 202 detects a plurality of parking spaces in step 304, specifically, based on sensor data obtained from a sensor system 208 of the vehicle. Sensor system 208 may, for example, include one or multiple ultrasonic sensors. In step 306, selection component 204 selects one of the detected parking spaces based on a degree of comfort. For this purpose, component 204 processes a plurality of predefined conditions which, for example, are stored in a data memory 210 associated with parking assistance system 200. Selection component 204 classifies the detected parking spaces based on these conditions according to the presumed driver acceptance. External data, for example data concerning a driver action, may be used for the selection. For this purpose, data concerning a year change 212 or a braking system 214 of the vehicle, for example, are used.

A signal concerning the selected parking space is then provided to assistance module 208 by selection module 204. In step 308, module 206 assists in the parking operation into the selected parking space. For this purpose, assistance component 206 may provide output signals on an HMI 216 and/or braking control system 218 and/or an engine controller (not shown). The operating method of parking assistance system 200 terminates in step 310.

Figure 4:
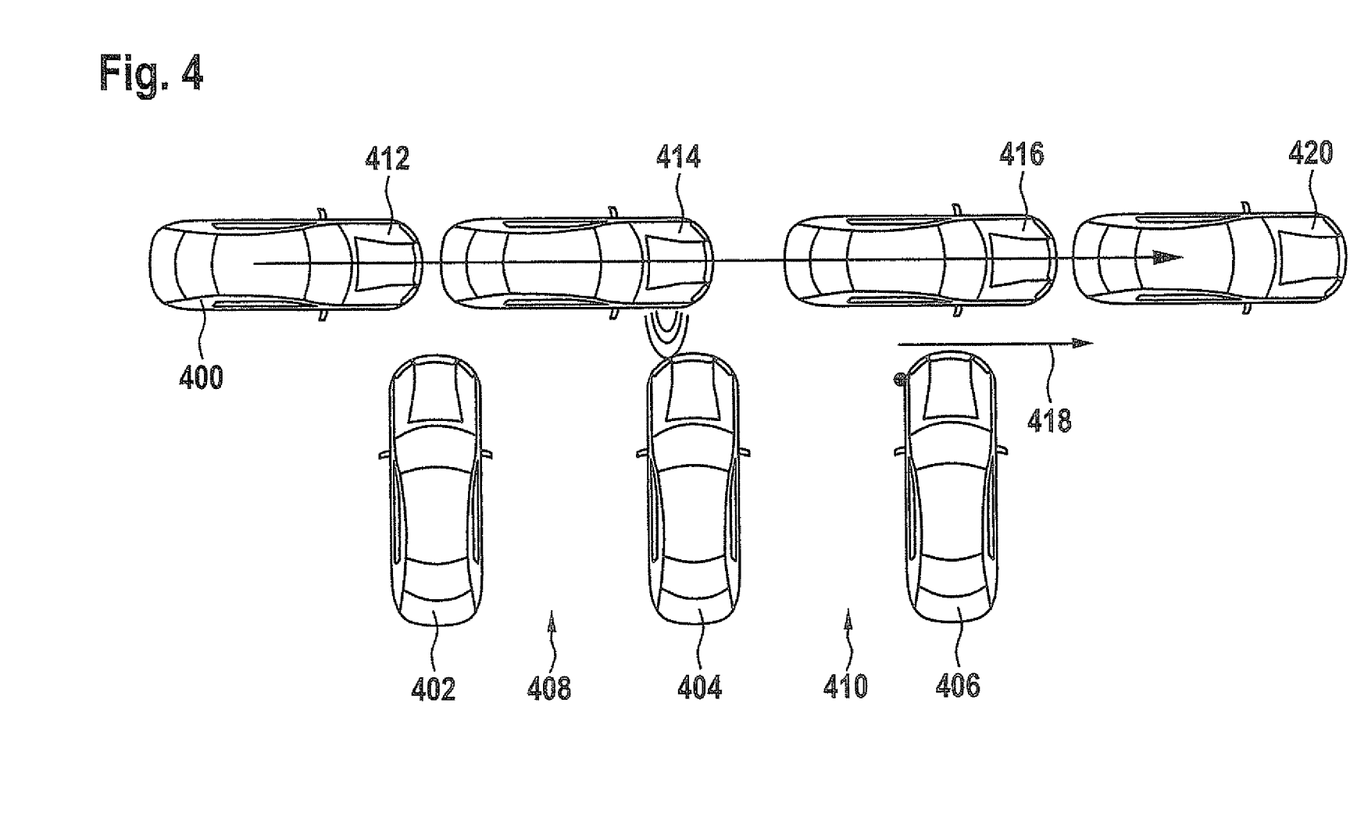
FIG. 4 shows a first example of an application scenario for the parking assistance system according to the present invention from FIG. 2.

FIG. 4 illustrates a first application scenario, on the basis of which functionalities of parking assistance system 200 from FIG. 2 are further illustrated as an example. A vehicle 400 travels past vehicles 402, 404, and 406, between which two parking spaces 408 and 410 are present. Vehicle 400 moves from a position 412 into a position 414. At this position, parking assistance system 200 offers the driver the option to park in first parking space 408. By the time the driver brings the vehicle to a stop, it is in position 416. At this point in time the system has already detected second parking space 410. Selection module 204 now classifies the two detected parking spaces 408 and 410 with the objective of carrying out a parking operation in the particular one of the two parking spaces which has the highest level of driver acceptance.

Figure 5:
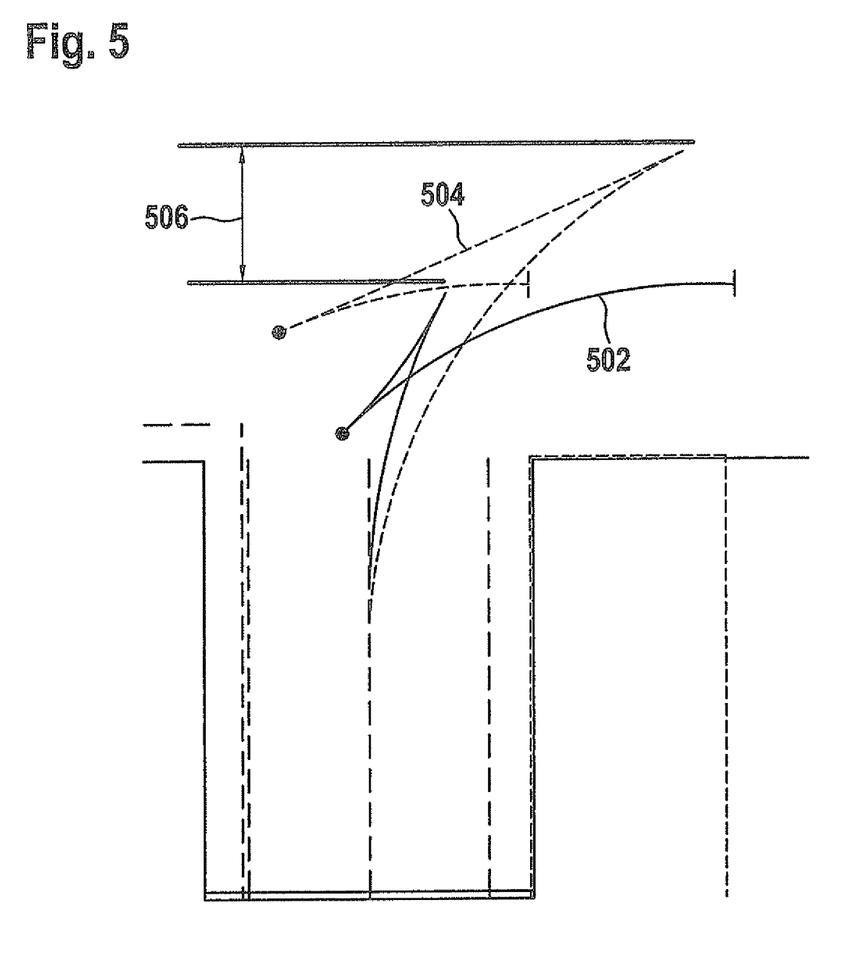
FIG. 5 shows, with reference to the application scenario from FIG. 4, an illustration of possible parking trajectories.

For the further discussion of the situation in FIG. 4, two parking trajectories 502 and 504 are illustrated in FIG. 5. Parking trajectory 502 would result, for example, if the vehicle were parked in parking space 408 from stopped position 416. Trajectory 504 would result, for example, if the vehicle were parked in parking space 410 instead. It is clearly apparent that parking in parking space 410 requires a wider swing-out, for example into an opposite traffic lane, than for parking in parking space 408. For this reason, a human driver would intuitively prefer parking space 408 over parking space 410.

Corresponding to the above discussion, selection module 204 of parking assistance system 200 processes a condition which classifies detected parking spaces 408 and 410 according to which requires less swing-out. In other words, the particular parking space of detected parking spaces 408, 410 is identified for which the swing-out behavior of the vehicle during a parking operation to be carried out is minimal. Based on this condition, module 204 selects parking space 408. Thus, the parking assistance system will offer and/or carry out parking in parking space 408 instead of in the last detected parking space 410. This results in parking behavior which is typical for a human driver. A parking trajectory results in which the space requirements, for example in the opposite traffic lane, or with respect to other parking vehicles or other lane boundaries, are minimized. Thus, the behavior of the automatically guided vehicle corresponds to the driver's intuition, and also may possibly have a higher level of acceptance by other motorists.

The above-described condition for classifying parking spaces according to minimum swing-out behavior is used only within a predefined travel range for classification of parking spaces. Parking space 408 is considered for parking, and therefore for a classification, only as long as the distance from parking space 408 has not yet exceeded a certain maximum distance. Such a maximum distance may either be predefined, or, for example, may also be a function of the position of parking space 410. Providing such a distance avoids a wide swing-out, which is atypical for a driver, when backing into a parking space. If vehicle 400 is already in position 420, for example, the vehicle should no longer back into parking space 408, but instead should park in parking space 410. Another example of a travel range is illustrated by a minimum distance 418 in FIG. 4. This involves a minimum or blocking distance which is predefined, or computed for a situation based on other influencing variables; if the distance from the parking space is less than minimum distance 418, the space is not taken into account for the classification, and therefore is not considered for parking. For the predefined minimum and maximum distance, a classification is made only within a certain range of vehicle positions.

Figure 6A:
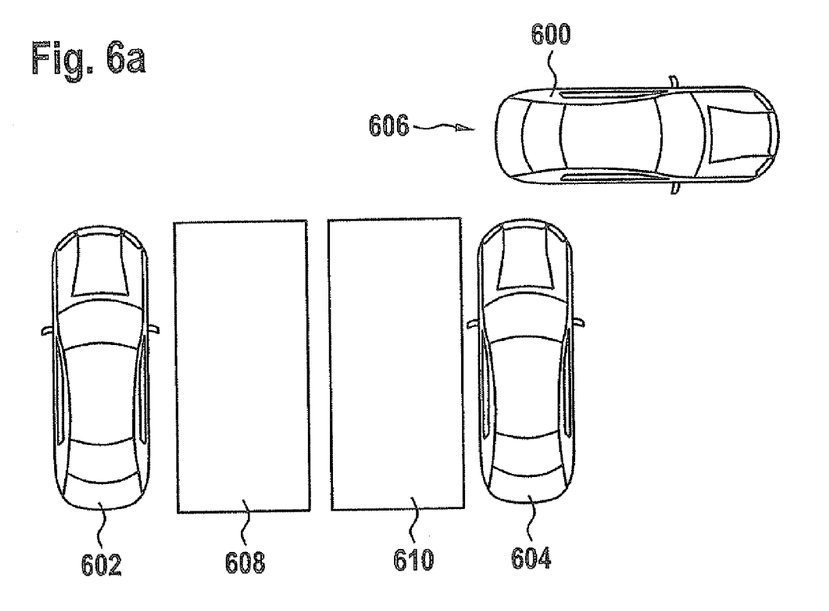
FIG. 6a shows a second example of an application scenario for the parking assistance system according to the present invention from FIG. 2.

Another example of a functionality of parking assistance system 200 according to the present invention from FIG. 2 is described below with reference to FIG. 6*a*. A vehicle 600 has driven past objects 602 and 604 which border parking spaces, and has come to a stop in position 606. The parking assistance system has detected parking spaces 608 and 610. For classifying detected parking spaces 608, 610, selection module 204 uses classification conditions from memory 210. For the case of directly adjacent, double parking spaces or multiple parking spaces, a predefined condition is conceivable which classifies the parking spaces according to the presence of sufficient space for the driver to comfortably exit the vehicle. This condition ensures that the particular parking space is selected for which the driver is able to most easily exit the vehicle. Thus, once again the system selects a parking space which the driver himself would generally have chosen.

Figure 6B:
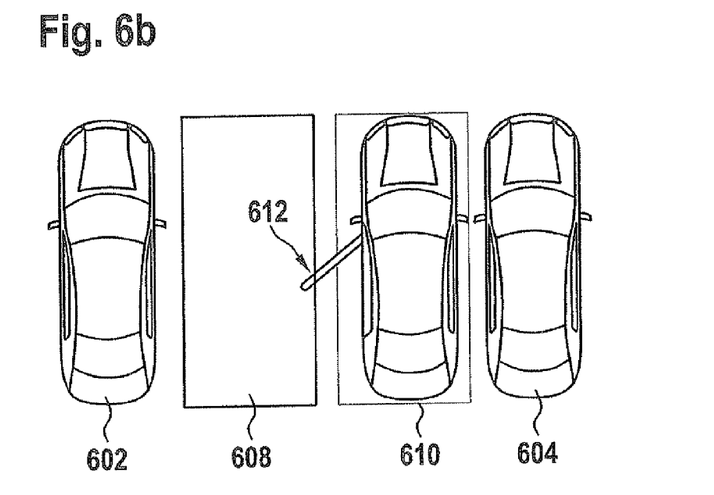

The result of the selection by the parking assistance system is illustrated in FIG. 6*b*: vehicle 600 is guided into parking space 610, since in this case the driver is able to exit the vehicle (as indicated by opened exit door 612) more comfortably than would be the case for a parking position in parking space 608.

Figure 7:
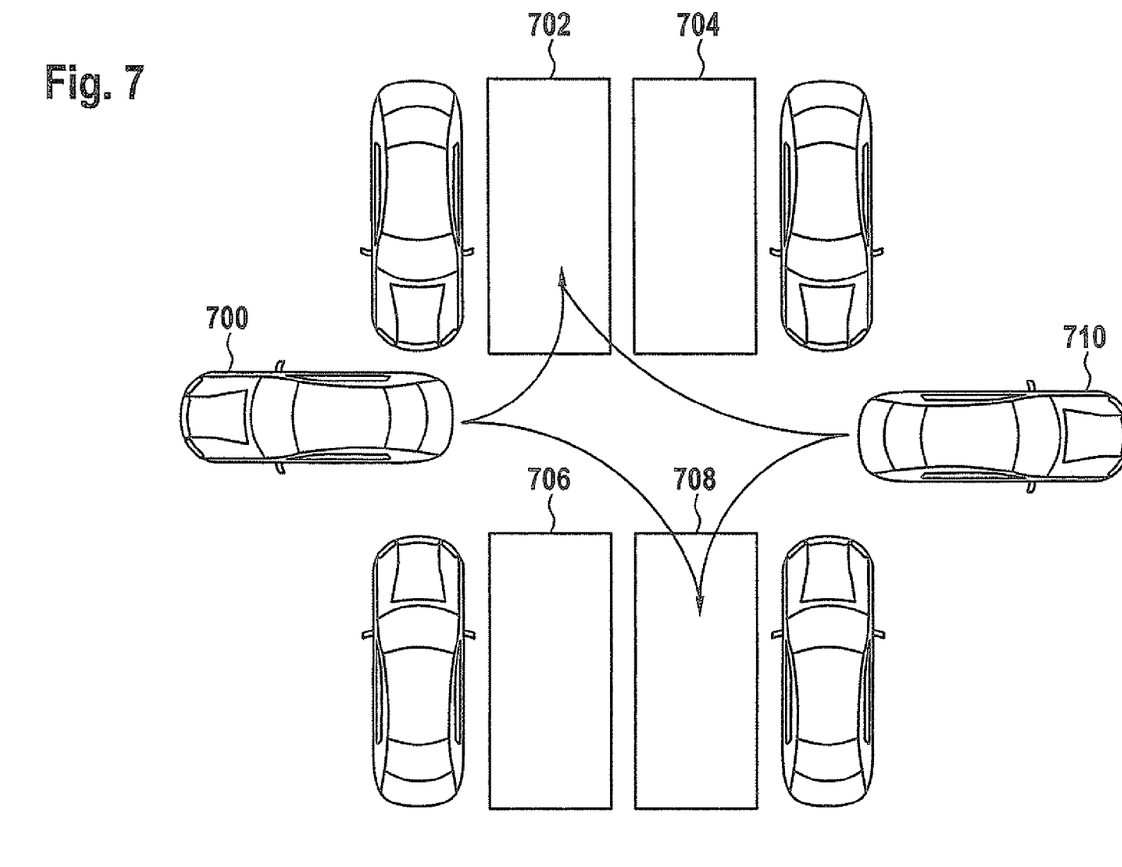
FIG. 7 shows an illustration of the general behavior of the parking assistance system according to the present invention from FIG. 2, in scenarios for variants of the second application scenario.

FIG. 7 illustrates in general terms the positioning concept based on the corresponding rule. For detected parking spaces 702 and 704, a vehicle 700 would be guided into parking space 702 by the parking assistance system. Based on the classification of parking spaces 706 and 708, vehicle 700 would be guided into parking space 708. The same parking spaces would be selected by a parking assistance system of a vehicle 710 having the same design according to the present invention, specifically, when this vehicle 710 is traveling in the opposite direction as vehicle 700. It is pointed out that the comfort condition or rule for the driver to comfortably exit the vehicle, as illustrated in FIGS. 6*b* and 7, is adapted for vehicles in which the steering wheel, i.e., the driver's side, is on the left. If the driver's side is on the right, the rule is to be reversed.

It is conceivable to provide another predefined condition which classifies detected parking spaces according to the presence of sufficient space for (also) the passenger to comfortably exit the vehicle. If both rules are active, of three directly adjacent parking spaces, for example, the center space would be selected.

Figure 8A:
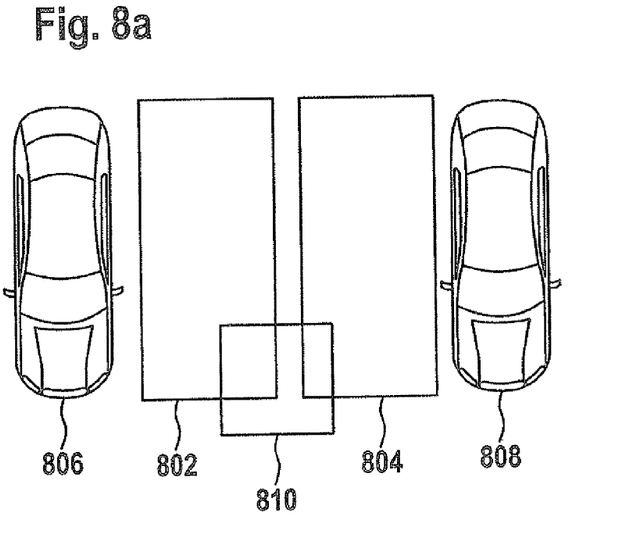
FIG. 8a shows another aspect of the second application scenario, with an illustration of a tolerance range of the parking assistance system from FIG. 2.
Figure 8B:
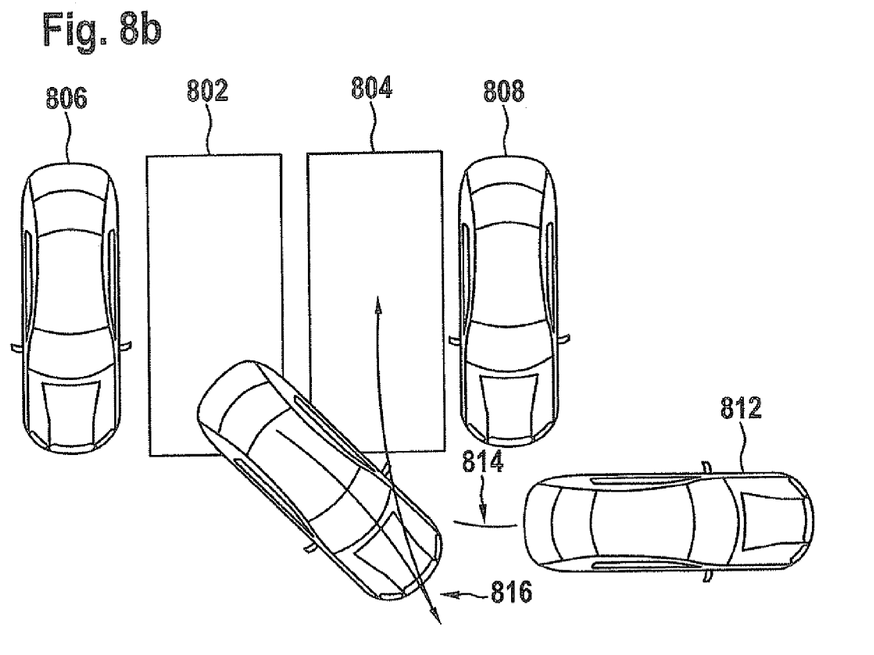
FIG. 8b shows an illustration of the behavior of the parking assistance system according to the present invention from FIG. 2, in the situation shown in FIG. 8a for detecting a driver action.

With reference to FIGS. 8*a* and 8*b*, an example of another classification rule or condition is explained which may be used by the parking assistance system for classifying directly adjacent double or multiple parking spaces, specifically, alternatively or in addition to the above-described examples. Available parking spaces may be classified before, but also and in particular during, a parking operation in progress. This may occur, for example, based on detected driver actions. Such a driver action may include, for example, a gear shift and/or an operation of a vehicle brake. For this reason, appropriate sensor data are supplied to selection component 204 in FIG. 2. If this is a classification carried out during a parking operation already in progress, a tolerance range may be predefined, within which an appropriate predefined condition is used for the classification, while after leaving the tolerance range, classification no longer takes place; i.e., the parking assistance system no longer switches its guiding from the selected parking space to another space.

In FIG. 8*a*, two directly adjacent parking spaces 802 and 804 are located between objects 806 and 808 which border parking spaces. A tolerance range 810 based on parking spaces 802, 804 is likewise illustrated. With reference to the situation in FIG. 8*b*, the parking assistance system of a vehicle 812 has selected parking space 802 based on a classification condition described with reference to FIGS. 6 and 7, since in this case the driver has more room to exit the vehicle. During parking along trajectory 814, it is detected that the driver has made a gear shift from reverse to forward. Since this takes place within tolerance range 810, parking spaces 802 and 804 are reclassified. Based on the detected gear shift, it is assumed that the driver prefers parking space 804 over parking space 802. Therefore, the parking operation is reconfigured for parking space 804; i.e., vehicle 812 is now further guided based on trajectory 816.

The present invention is not limited to the above-described exemplary embodiments and the aspects emphasized therein; rather, within the scope of the dependent claims the present invention may also be implemented in numerous modifications within the scope of procedures carried out by those skilled in the art.

What is claimed is:

1. A method, in a parking assistance system, for assisting in a parking operation of a vehicle, the method comprising:
   detecting a plurality of available parking spaces by one or more sensors positioned exclusively on the vehicle;
   classifying the plurality of detected available parking spaces by at least one predefined condition based on the available space and a position of the vehicle;
   selecting one of the detected parking spaces within a predetermined distance of the vehicle based on the at least one predefined condition, the predefined conditions including: a minimum required swing-out, a parking trajectory with a minimum required space across a lane boundary, and a space available for exiting the vehicle; and
   assisting in the parking operation into the selected parking space.

2. The method of claim 1, wherein the at least one predefined condition concerns a classification of the detected parking spaces according to a minimum swing-out behavior of the vehicle during the parking operation.

3. The method of claim 2, wherein the predefined condition is used only within a travel range, based on one or more of the detected parking spaces, for classifying these parking spaces.

4. The method of claim 1, wherein the at least one predefined condition concerns a classification of the detected parking spaces according to the presence of sufficient space for the driver to comfortably exit the vehicle.

5. The method of claim 1, wherein the at least one predefined condition concerns a classification of the detected parking spaces according to the presence of sufficient space for the passenger to comfortably exit the vehicle.

6. The method of claim 1, wherein the at least one predefined condition concerns a classification of the detected parking spaces based on a detection of a driver action.

7. The method as recited in claim 6, wherein the driver action includes at least one of a gear shift and an operation of a vehicle brake.

8. The method of claim 6, wherein the predefined condition is used only within a tolerance range, based on one or more of the detected parking spaces, for classifying these parking spaces.

9. A non-transitory computer readable medium having a computer program, which is executable by a processor, comprising:
 a program code arrangement having program code for assisting in a parking operation of a vehicle, by performing the following:
 detecting a plurality of available parking spaces by one or more sensors positioned exclusively on the vehicle;
 classifying the plurality of detected available parking spaces by at least one predefined condition based on the available space and a position of the vehicle;
 selecting one of the detected parking spaces within a predetermined distance of the vehicle based on the at least one predefined condition, the predefined conditions including: a minimum required swing-out, a parking trajectory with a minimum required space across a lane boundary, and a space available for exiting the vehicle; and
 assisting in the parking operation into the selected parking space.

10. A parking assistance system, for assisting in a parking operation of a vehicle, comprising:
 a detecting component to detect a plurality of available parking spaces, the detecting component positioned exclusively on the vehicle;
 a classifying component to classify the plurality of detected available parking spaces by at least one predefined condition based on the available space and a position of the vehicle;
 a selecting component to select one of the detected parking spaces within a predetermined distance of the vehicle based on the at least one predefined condition, the predefined conditions including: a minimum required swing-out, a parking trajectory with a minimum required space across a lane boundary, and a space available for exiting the vehicle; and
 an assisting component to assist in the parking operation into the selected parking space.

11. The method of claim 1, wherein the detected parking space having the minimum required swing-out is selected.

12. The method of claim 1, wherein the detected parking space having the parking trajectory with the minimum required space across the lane boundary is selected.

13. The method of claim 1, wherein the detected parking space having a predetermined space available for exiting the vehicle is selected.

* * * * *